United States Patent Office 3,236,731
Patented Feb. 22, 1966

3,236,731
QUICK ACTING AGENT AGAINST AMENORRHEA
Kurt Lange-Sundermann, Bremen, Germany, assignor, by mesne assignments, to Brinkmann A.G., Bremen, Germany
No Drawing. Filed July 2, 1962, Ser. No. 207,018
Claims priority, application Germany, July 1, 1961, Sch 29,937
14 Claims. (Cl. 167—74)

The present invention relates to new compounds which are quick acting agents against amenorrhea and more particularly to a new series of steroid compounds, and intermediates in the production thereof, which are valuable agents in the treatment of amenorrhea.

In gynecology it has been desired and found advisable to have a short and quick acting amenorrhea medication. In the first place with such medication it would be possible to obtain a rapid menstrual bleeding. The medications hitherto known as having a progestational action have the disadvantage that several days are required for the starting of the bleeding. Consequently, the search for active substances which act in a new physiological manner to give the desired bleeding in the shortest possible time has been carried out and the need and desire for agents to accomplish this result is well known.

It is accordingly a primary object of the present invention to provide for new agents which rapidly cause menstrual bleeding.

It is another object of the present invention to provide menstrual bleeding shortly after administration of the agent and which in other ways also have gynecological advantages.

It is yet another object of the present invention to provide a new series of steroid compounds having the desired properties indicated herein.

It is yet another object of the present invention to provide a method of producing the new steroid compounds of this invention.

It is still a further object of the present invention to provide new intermediates in the production of the active steroid compounds of this invention.

Other objects and advantages of the present invention will be apparent from a further reading of the specification and of the appended claims.

With the above and other objects in view, the present invention mainly comprises a compound selected from the group consisting of compounds of the formula:

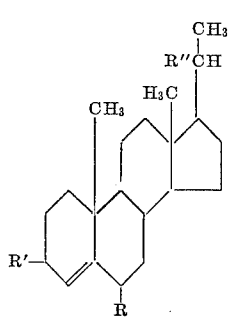

and compounds of the formula:

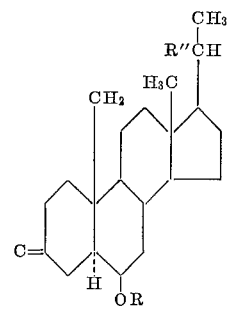

wherein R is selected from the group consisting of βOH and βOacyl, wherein R' is selected from the group consisting of βOH, βOacyl and =O, and wherein R" is selected from the group consisting of βOH and βOacyl, acyl in all cases being derived from a lower aliphatic carboxylic acid.

It has been found in accordance with the present invention that the new Δ⁴-pregnene-6β,20β-diol-3-one, as well as the new isomeric allopregnane-20β-ol-3,6-dione which is formed from Δ⁴-pregnene-6β,20β-diol-3-one by intramolecular rearrangement thereof, as well as the esters of these compounds, are active agents with the above mentioned desired characteristics. Thus these compounds cause the desired menstrual bleeding of the uterus mucosa already within a few hours after administration thereof.

Although the 6-position hydroxyl group of the Δ⁴-pregnene-6,20β-diol-3-one is in β-position, the question of whether it is in alpha or beta position is of little importance because after the administration of the Δ⁴-pregnene compound into the human organism it rearranges by biochemical reaction into the isomeric allopregnane compound, which has the same action as the Δ⁴-pregnene compound.

Until now only suppositions (capillary effect action—see further below) had been made concerning the detailed mechanism of action which causes the start of menstrual bleeding of the uterus mucosa after administration of the new agents of the present invention. One hint is given by the observation that in the presence of progesterone, either due to a condition of pregnancy or due to prior or simultaneous administration of progesterone, the bleeding-causing effect of the new agents of the present invention does not occur.

For this reason it is apparent that the new agents are well suited for the early diagnosis of pregnancy.

The above mentioned antagonism between the new agents and the progestational agents leads to the assumption that possibly with the new agents of the present invention there has been found the actual menstruation-causing hormones, the existence of which have been suspected for quite some time. It would be expected that the menstruation causing hormones, the action of which can be suppressed by progestational agents, would influence the juvenile capillary vessels of the uterus mucosa so as to cause bleeding.

A further area of use of the new agents of the present invention is in the treatment of cystic glandular hyperplasie, wherein the new agents of the present invention are actually the agents of choice.

The new compounds of the present invention may be produced using methods which aside from the materials being treated are otherwise analogous methods in the art of steroid chemistry.

A preferred starting material is the hitherto unknown compound $\Delta^4$-pregnene-3$\beta$,6$\beta$,20$\beta$-triol which is easily obtainable from the known $\Delta^4$-pregnene-3$\beta$,6$\beta$-diol-20-one by reduction by means of lithiumaluminumhydride, sodium-borohydride or other suitable reduction agents.

By the selective oxidation of the 3-position hydroxyl group of $\Delta^4$-pregnene-3$\beta$,6$\beta$,20$\beta$-triol utilizing known methods of oxidation, preferably by the use of manganese dioxide in a solvent which is inert to the oxidation agent, the $\Delta^4$-pregnene-6$\beta$,20$\beta$-diol-3-one is obtained. At the same time there is obtained, because of partial rearrangement of the primary oxidation product, a considerable amount of allopregnane-20$\beta$-ol-3,6-diol. By recrystallization of the crude oxidation product the produced $\Delta^4$-pregnene-6$\beta$,20$\beta$-diol-3-one is only partially (about 20%) isolated in pure condition.

If desired the pure $\Delta^4$-pregnene-6$\beta$,20$\beta$-diol-3-one can subsequently in known manner be converted into its 6$\beta$-derivative and/or 20$\beta$-derivative, particularly into the esters such as esters of lower aliphatic carboxylic acids e.g. acetate, propionate, butyrate and succinate, or of suitable anorganic acids e.g. hemisulfate and phosphate which are most useful in the steroid chemistry field. These derivatives can be used as pharmaceutical agents.

In addition, the intermediate production of such derivatives can also be used for the further purification of the crude oxidation product. The pure $\Delta^4$-pregnene-6$\beta$,20$\beta$-diol-3-one by heating in alkaline or acid medium can be practically quantitatively converted to allopregnane-20$\beta$-ol-3,6-dione. The pure production of the allopregnane-20$\beta$-ol-3,6-dione is preferable either after separation of the pure $\Delta^4$-pregnene-6$\beta$,20$\beta$-diol-3-one remaining syrupy crystallization residue or the entire mass of crude product obtained by the selective oxidation with manganese dioxide can be rearranged with alkali and the pure allopregnane-20$\beta$-ol-3,6-dione can then in normal manner, for example by crystallization from the crude rearrangement product, be separated. If desired the separated allopregnane-20$\beta$-ol-3,6-dione can subsequently in known manner be converted into its 20$\beta$-derivative, particularly into an ester such as a lower aliphatic carboxylic acid ester, which is useful in the art of steroid chemistry.

The following examples are given to further illustrate the present invention. The scope of the invention is not, however, meant to be limited to the specific details of the examples.

EXAMPLE 1

(a) Production of the starting material 20 g. of $\Delta^4$-pregnene-3$\beta$,6$\beta$-diol-20-one are allowed to stand at room temperature for one hour with 1.0 g. of sodiumborohydride in 180 cc. of 80% aqueous dioxane. The excess of sodiumborohydride is subsequently mixed with 50 cc. of 20% acetic acid and with water is then diluted to a volume of 500 cc. The aqueous solution is extracted three times with chloroform, the purified chloroform phase is washed three times, each time with 300 cc. of water, and dried over water-free sodium sulfate.

After filtering off the drying agent the chloroform is evaporated under vacuum to dryness. The residue of 18.9 g. (94.5% of the theoretical) is recrystallized two times from acetone-petroleum ether (boiling point 70–90° C.), whereby the melting point of the obtained $\Delta^4$-pregnene-3$\beta$,6$\beta$,20$\beta$-triol is increased to 185–185.5° C. The product is converted into the triacetate for further characterization. The melting point is 171.5–173° C.

$$[\alpha]_D^{20} = -5.6°$$

(b) Oxidation of the starting material 2.0 g. of $\Delta^4$-pregnene-3$\beta$,6$\beta$,20$\beta$-triol are shaken at room temperature for 40 hours with 20 g. of manganese dioxide in 200 cc. of chloroform. After standing the overlying chloroform solution is filtered off and the manganese dioxide residue is cooked five times, each time with 100 cc. of chloroform. The purified chloroform extract is evaporated to dryness under vacuum. The evaporation residue of 1.4 g. (70% of the theoretical), is dissolved in acetone and mixed with petroleum ether (boiling point 70–90° C.) until turbidity. After following crystallization the obtained 435 mg. (21.8%) of $\Delta^4$-pregnene-diol-6$\beta$,20$\beta$-3-one having a melting point of 181.5–185° C. is recrystallized two times from acetone-petroleum ether (boiling point 70–90° C.) resulting in an increase in the melting point to 186.5–189° C.

$$\lambda_{max} = 1680_{cm}-1$$

The residue which separates as a syrup contains considerable amounts of allopregnane-20$\beta$-ol-3,6-dione besides additional $\Delta^4$-pregnene-6$\beta$,20$\beta$-diol-3-one.

EXAMPLE 2

Rearrangement of pure $\Delta^4$-pregnene-6$\beta$,20$\beta$-diol-3-one

The solution of 50 mg of $\Delta^4$-pregnene-3-one-6$\beta$,20$\beta$-diol in 10 cc. of methanol is mixed with 0.5 g. of potassium hydroxide dissolved in 2 cc. of water and cooked under refluxing for one hour. After cooling the solution is neutralized with dilute acetic acid, extracted three times with chloroform, the purified chloroform extract washed with water, dried with water-free sodium sulfate and after filtration of the solvent is brought to dryness under vacuum by evaporation. The thus obtained crude allopregnane-20$\beta$-ol-3,6-dione, obtained in a yield of 41.3 mg. (82.6% of the theoretical) is recrystallized two times from acetone-petroleum ether (boiling point 70–90° C.) and is then found to have a melting point of 232–236° C.

$$\lambda_{max} = 1714_{cm}-1$$

EXAMPLE 3

Rearrangement of the crystallization residue 1.2 g. of syrupy crystallization residue obtained according to Example 1b is dissolved in 200 cc. of methanol, mixed with 1.4 g. of potassium hydroxide in 40 cc. of water and cooked under refluxing for one hour. Thereafter the reaction mixture is further worked up analogously to Example 2 and there is thus obtained an additional 0.765 g. (68% of the theoretical) of allopregnane-20$\beta$-ol-3,6-dione.

EXAMPLE 4

2.0 g. of 5$\alpha$-pregnane-20$\beta$-ol-3,6-dione with 3.0 g. of succinic acid anhydride, 1.0 g. of succinic acid and 8.0 cc. of pyridine are heated to refluxing for 3½ hours. Subsequently the reaction mixture is poured into ice water under stirring, the separated product is filtered off under suction, washed under water and dried. The thus obtained 20-hemisuccinate of 5$\alpha$-pregnane-20$\beta$-ol-3,6-dione after recrystallization from ethyl acetate melts at 227.5–230° C. The yield is 2.3 g. Further recrystallization results in increase of the melting point to 228.5–230° C.

$$[\alpha]_D^{26} = 19° (CHCl_3)$$

The hemisuccinate dissolves in water with sodium carbonate with the formation of the hemisuccinate-sodium salt. Analogously there is obtained from the hemisuccinate with methyl glucamine the methyl glucamine salt.

EXAMPLE 5

5.0 g. of 5$\alpha$-pregnane-20$\beta$-ol-3,6-dione are heated for four hours on a steam bath with 12 cc. of propionic acid anhydride in 20 cc. of pyridine. The reaction product is then stirred into ice water and the stirring is continued for an additional two hours. After the precipitate is filtered off under suction it is washed with water, dried and then recrystallized from methanol. The thus obtained 20-propionate of 5$\alpha$-pregnane-20$\beta$-ol-3,6-dione melts at 197–199° C. After further recrystallization the substance exhibits a melting point of 200–200.5° C.

$[\alpha]_D^{26}$ 18° (CHCL$_3$)

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A compound selected from the group consisting of compounds of the formula:

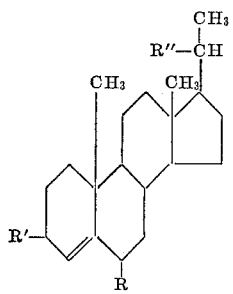

and compounds of the formula:

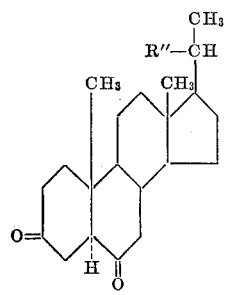

wherein R is selected from the group consisting of βOH and βOacyl, wherein R' is =O, and wherein R'' is selected from the group consisting of βOH and βOacyl, Oacyl in all cases being selected from the group consisting of acetate, propionate, butyrate, succinate, hemisulfate and phosphate.

2. Δ$^4$-pregnene-6β,20β-diol-3-one.

3. Δ$^4$-pregnene-6β,20β-diol-3-one-20-ester wherein ester is selected from the group consisting of acetate, propionate, butyrate, succinate, hemisulfate and phosphate.

4. Δ$^4$-pregnene-6β,20β-diol-3-one-20-acetate.

5. Allopregnane-20β-ol-3,6-dione.

6. Allopregnane-20β-ol-3,6-dione-20-ester wherein ester is selected from the group consisting of acetate, propionate, butyrate, succinate, hemisulfate and phosphate.

7. Allopregnane-20β-ol-3,6-dione-20-acetate.

8. The method which comprises reducing Δ$^4$-pregnene-3β,6β-diol-20-one by means of a reducing agent selected from the group consisting of lithiumaluminumhydride and sodiumborohydride, thereby forming Δ$^4$-pregnene-3β,6β,20β-triol; and oxidizing said Δ$^4$-pregnene-3β,6β,20β-triol by means of manganese dioxide so as to cause selective oxidation of the 3-position hydroxyl group, thereby forming Δ$^4$-pregnene-6β,20β-diol-3-one and the isomeric allopregnane-20β-ol-3,6-dione.

9. The method which comprises oxidizing Δ$^4$-pregnene-3β,6β,20β-triol by means of manganese dioxide so as to cause selective oxidation of the 3-position hydroxyl group, thereby forming Δ$^4$-pregnene-6β,20β-diol-3-one and the isomeric allopregnane-20β-ol-3,6-dione; and treating said Δ$^4$-pregnene-6β,20β-diol-3-one in a medium selected from the group consisting of alkaline and acid medium so as to convert the same to the isomeric allopregnane-20β-ol-3,6-dione.

10. The method which comprises oxidizing Δ$^4$-pregnene-3β,6β,20β-triol by means of manganese dioxide so as to cause selective oxidation of the 3-position hydroxyl group, thereby forming Δ$^4$-pregnene-6β,20β-diol-3-one and the isomeric allopregnane-20β-ol-3,6-dione; and treating said Δ$^4$-pregnene-6β,20β-diol-3-one with alcoholic alkali hydroxide so as to convert the same to the isomeric allopregnane-20β-ol-3,6-dione.

11. The method which comprises oxidizing Δ$^4$-pregnene-3β,6β,20β-triol by means of manganese dioxide so as to cause selective oxidation of the 3-position hydroxyl group, thereby forming a reaction mass containing Δ$^4$-pregnene-6β20β-diol-3-one and the isomeric allopregnane-20β-ol-3,6-dione; subjecting the reaction mass to crystallization, thereby separating said Δ$^4$-pregnene-6β,20β-diol-3-one and said allopregnane-20β-ol-3,6-dione from each other; and treating said Δ$^4$-pregnene-6β,20β-diol-3-one in a medium selected from the group consisting of alkaline and acid medium so as to convert the same to the isomeric allopregnane 20β-ol-3,6-dione.

12. 20-hemisuccinate of 5α-pregnane-20β-ol-3,6-dione.

13. 20-propionate of 5α-pregnane-20β-ol-3,6-dione.

14. Method of treating amenorrhea and glandular cystic hyperplasia, which comprises administering to a patient having such condition an effective amount of a compound selected from the group consisting of compounds of the formula:

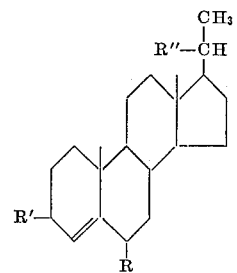

and compounds of the formula:

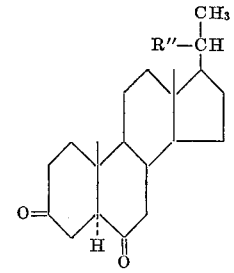

wherein R is selected from the group consisting of βOH and βOacyl, wherein R' is selected from the group consisting of βOH, βOacyl and =O, and wherein R'' is selected from the group consisting of βOH and βOacyl, Oacyl in all cases being selected from the group consisting of acetate, propionate, butyrate, succinate, hemisulfate and phosphate.

References Cited by the Examiner

UNITED STATES PATENTS 2,900,382   8/1959   Sondheimer et al. __ 260—239.55

OTHER REFERENCES

Oliveto et al., "J. Amer. Chem. Soc." (1953), Vol. 75, page 488.

LEWIS GOTTS, *Primary Examiner.*